United States Patent [19]

Bjelvert

[11] 3,790,891

[45] Feb. 5, 1974

[54] RECEIVER FOR A FREQUENCY-MODULATED ELECTRO-ACOUSTICAL SIGNAL HAVING SQUELCH MEANS FOR SUPPRESSING NOISE WHEN NO SIGNAL IS COMING THROUGH THE RECEIVER

[76] Inventor: Sven William Bjelvert, Anells vag 6, 633 69, Eskilstuna, Sweden

[22] Filed: Aug. 8, 1972

[21] Appl. No.: 278,814

[30] Foreign Application Priority Data

May 24, 1972 Sweden .......................... 6730/72

[52] U.S. Cl. .................................. 325/348, 325/28

[51] Int. Cl. .......................................... H04b 1/10

[58] Field of Search ..... 325/348, 28, 402, 403, 478; 340/207

[56] References Cited

UNITED STATES PATENTS 3,568,068 3/1971 Russell .............................. 325/348

3,218,607 11/1965 Brock et al. ......................... 325/28

*Primary Examiner*—Albert J. Mayer

*Attorney, Agent, or Firm*—Eric Y. Munson

[57] ABSTRACT

The invention relates to a receiver for a frequency-modulated electro-acoustical signal system and more particularly to a compression wave transmission system having a receiver which is adapted to suppress noise signals of frequencies other than the frequencies of the electro-acoustical frequencies, only during periods when no electro-acoustical or compression wave frequency is received. The receiver according to the invention is especially suitable for use in a wireless diver communication system for ultrasonic voice transmission.

3 Claims, 3 Drawing Figures

PATENTED FEB 5 1974 3,790,891

RECEIVER FOR A FREQUENCY-MODULATED ELECTRO-ACOUSTICAL SIGNAL HAVING SQUELCH MEANS FOR SUPPRESSING NOISE WHEN NO SIGNAL IS COMING THROUGH THE RECEIVER

BACKGROUND OF THE INVENTION

Aquatic telephone systems which are commonly used by divers which lack noise squelch means have the inherent disadvantage that vibrations from conventional breathing regulators are transmitted to the transducer and produce a strong noise disturbance in the earphones. Such noise disturbance arises during inhalation only, as the breathing regulators are normaly constructed to prevent creation of noise disturbance during exhalation, and become very annoying in course of time and cause undue diver fatique.

Among the objects of the invention is to eliminate the aforesaid disadvantage and provide a receiver which will suppress or squelch breathing noise, as well as other noises, such as boat noises and other aquatic background noises when no carrier wave frequency is coming through the receiver. It has been found that there is no need for any noise suppressor or noise squelch means when the carrier frequency is received since the voice will arise well above the interfering noise.

Further objects and advantages inherent in the invention will become apparent from the following description of a preferred embodiment and illustrated in the accompanying drawings.

DESCRIPTION OF A PREFERRED EMBODIMENT

Figures 1, 2, 3:
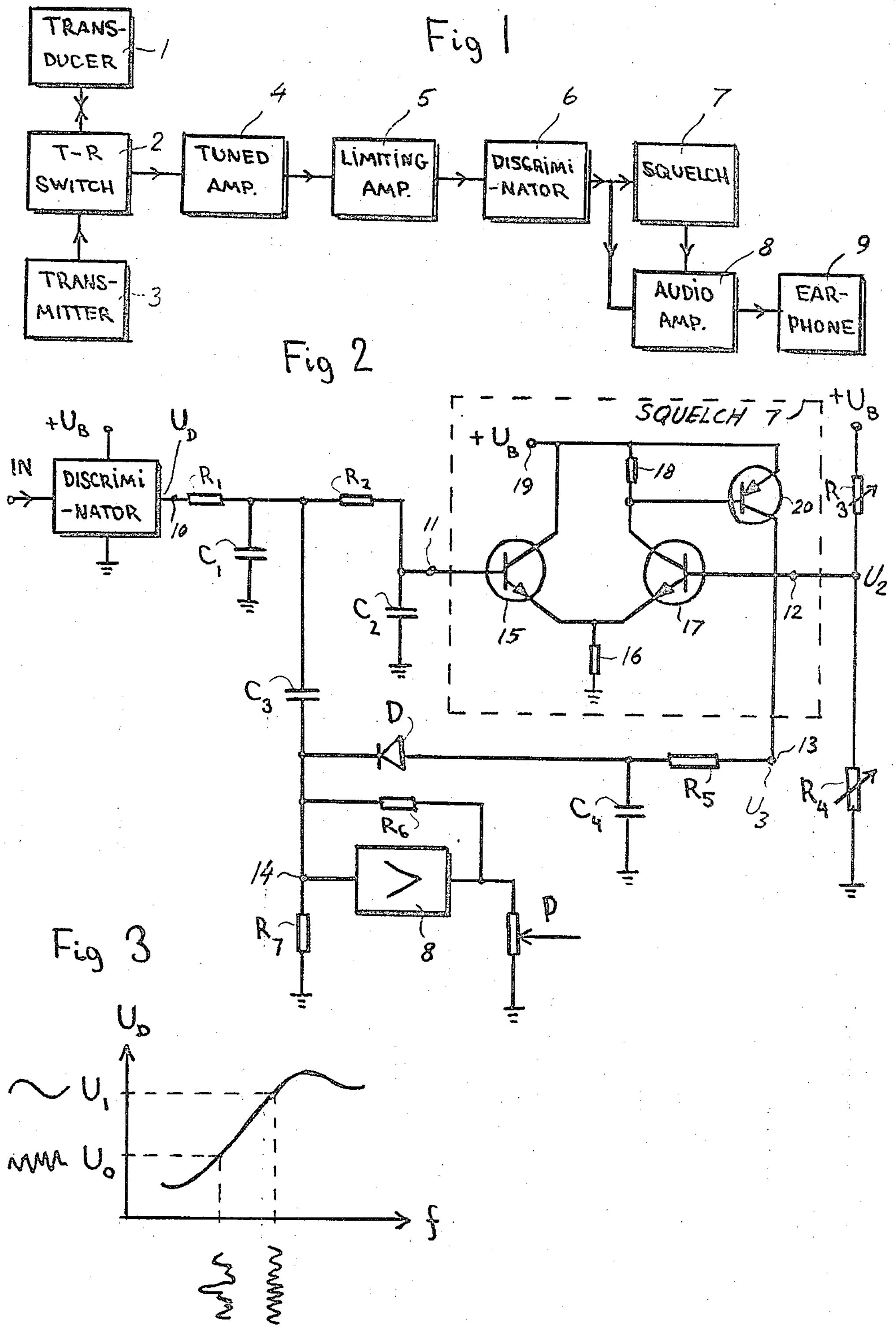
FIG. 1 is a schematic block circuit diagram of a transceiver system incorporating a receiver according to the invention.
FIG. 2 is a circuit diagram showing the noise suppressing parts of the receiver of FIG. 1.
FIG. 3 is a schematical graphical representation showing the output voltage $U_D$ of the discriminator shown in FIG. 2 as a function of the frequency f of said voltage.

Referring now to the drawings in detail, the present invention is illustrated in connection with a diving unit for an underwater telephone system. The diver telephone unit of FIG. 1 includes a transducer 1 for converting a frequency-modulated acoustic signal into a frequency-modulated electrical code signal, and conversely.

A transceiver switch 2 is provided to switch the system between transmission and reception. The reference numeral 3 indicates a transmitter. The transmitter does not constitute any part of the present invention and is, therefore, not described in detail. The transmitter can be of any conventional type of transmitter capable of producing an electrical intelligence signal to be fed through the transceiver switch 2 to the transducer 1.

When the transceiver switch 2 is set for reception, the frequency-modulated electrical signal received from the transducer 1 is fed in a conventional manner through a tuned amplifier 4 and a limiter amplifier 5 to a discriminator 6 of conventional type. The discriminator 6 is a so-called quadrature detector which uses the phase deviation in a circuit tuned to a frequency near the resonance frequency of said circuit. The output terminal of the discriminator 6 is connected to a squelch means 7 and to an audio amplifier 8, the output of which is fed to an ear-phone 9. The squelch 7 functions as an amplitude level detector giving a first output if the input exceeds a predetermined reference amplitude and a second output if the input falls below said reference amplitude.

The carrier wave frequency of the underwater telephone system is preferably chosen for about 90 kc. At this frequency the noise from water waves, boats, fish and so on is lesser than at those rather low frequencies that have been used hitherto in diver telephone systems.

The circuit diagram for the discriminator 6, the squelching means 7, and audio amplifier 8 is shown partly schematically in FIG. 2. A resistor $R_1$ and the capacitor $C_1$ constitute a filter $R_1$ $C_1$ which suppresses the high frequency signal portions that remain in the output $U_D$ of the discriminator 6. A RC-circuit $R_2$ $C_2$ is connected between ground and the junction between $R_1$ and $C_1$. The circuit $R_2$ $C_2$ integrates the signal derived from the discriminator 6 in order to prevent high noise amplitudes from affecting the the function of the squelch means 7. The junction between $R_2$ and $C_2$ is connected to a first input terminal 11 of the squelch means 7.

The squelch means 7 includes a transistor triode 15, the base of which is connected to the input terminal 11 of the squelch. The collector of the triode 15 is connected to a terminal 19 to which is applied the supply voltage $U_B$. The emitter of the transistor 15 is connected through a resistor 16 to ground and to the emitter of a transistor triode 17. The col-lector of the transistor 17 is connected through a resistor 18 to the supply terminal 19. The collector 17 is connected also to the base of a transistor triode 20, the emitter of which is connected to the supply terminal 19, and the collector of which is connected to the output terminal 13 of the squelch 7.

The base of the transistor 17 is connected via terminal 12 to the junction between two variable resistors $R_3$ and $R_4$. By variation of the resistors $R_3$ and $R_4$ a reference amplitude $U_2$ can be set up. The reference amplitude $U_2$ is applied to the second input terminal 12 of the squelch means 7. A resistor $R_5$ and a capacitor $C_4$ are connected in series between ground and the output terminal 13 of the squelch 7. The junction between $R_5$ and $C_4$ is connected to the anode of a rectifying diode $D_1$, the cathode of which is connected to one side of the capacitor $C_3$, the other side of which is connected to the junction between $R_1$ and $C_1$. The cathode of the rectifier D is also connected to the input terminal 14 of the audio amplifier 8.

A resistor $R_7$ is connected between ground and the terminal 14. A resitor $R_6$ is connected between the input terminal and the output terminal of the amplifier 8. The output from the audio amplifier 8 is received at P and fed to the earphone (not shown in FIG. 2).

FIG. 3 shows the voltage $U_D$ appearing at the output terminal 10 of the discriminator 6 as a function of the frequency f of said voltage. If no code signal is received, a direct voltage $U_o$ appears at the output terminal of the discriminator. The magnitude of the voltage $U_o$ depends upon the internal structure of the circuits and of the supply voltage $U_B$ (FIG. 2). If a noise signal is received and transmitted to the input terminal of the discriminator, the noise appearing at the output terminal of the discriminator will oscillate around $U_o$. If a frequency-modulated carrier wave is applied to the input terminal of the discriminator, a direct voltage $U_1$ having a low frequency signal superimposed thereon will appear at the output terminal of the discriminator. By variation of carrier frequency any desired direct voltage $U_1$ can be developed. The difference between $U_1$ and $U_o$ should be of such magnitude as to enable a sure detection of said difference. However, the difference between $U_1$ and $U_o$ must not be so great that the non-linear portion of the discriminator curve of FIG. 3 is reached. The magnitude of the reference direct voltage amplitude $U_2$ (FIG. 2) has been given a value ranging between $U_0$ and $U_1$ so that $U_1$ excees the reference amplitude, whereas $U_0$ falls below the reference amplitude.

If no carrier wave frequency is received, $U_D$ equals $U_o$, and the squelch means 7 gives a relatively high output voltage $U_3$ at its output terminal 13. Current is then flowing from terminal 13 through $R_5$, D and $R_7$. Noise signals from $C_3$ are then partly short-circuited through D and $C_4$ to ground. Said current from terminal 13 has such amplitude as to cause saturation of the amplifier so that no amplification of any low frequency signal takes place. It is conventional and well-known in the art that saturation parameters of an amplifier can be dimensioned in such a way that small variations of the input signal do not have any influence on the output of the amplifier which thus remains at a constant DC-value. Since the function of the saturated amplifier is well-known to those skilled in the art it is not deemed necessary to describe it in more detail.

However, when a carrier wave frequency is received, $U_D$ equals $U_1$ causing the squelch means 7 to produce a relatively low output voltage $U_3$ at the terminal 13. The rectifier D is thereby cut off so that low frequency signals from $C_3$ flow to the input terminal 14 of the amplifier 8, said low frequency signals being amplified by amplifier 8 so that an output is derived at P.

While one specific embodiment of the invention has been described in detail above it is to be understood that various modifications may be made from the specific details described without departing from the spirit and scope of the invention.

What is claimed:

1. An underwater telephone receiver for a frequency-modulated compression wave transmission system having means for suppressing a noise signal having other frequencies than said compression wave, when said compression wave is absent, comprising:

a. a transducer for receiving the compression wave and the noise signal and for converting the compression wave to a frequency-modulated electrical intelligence signal and for converting the noise signal into a frequency-modulated electrical noise signal;

b. a quadrature detector discriminator for converting said frequency-modulated electrical signals into an amplitude-modulated electrical intelligence signal and into a amplitude-modulated electrical noise signal, respectively;

c. said amplitude-modulated intelligence signal having an amplitude level exceeding a predetermined reference amplitude, and said amplitude-modulated noise signal having an amplitude level falling below said reference amplitude;

d. means for integrating said amplitude-modulated intelligence signal and noise signal and producing a direct current signal;

e. audio amplifying means for amplifying said amplitude-modulated intelligence signal; and f. squelching means for detection of said direct current signal and producing an output which fully saturates said amplifying means when the discriminator generates said amplitude-modulated noise signal in absence of said amplitude-modulated intelligence signal.

2. A receiver according to claim 1, which includes a rectifying diode, the anode of which is connected to the output of said squelching means, and the cathode of which is connected to an input of said amplifying means.

3. A receiver according to claim 2, in which a resistor is connected between a first input terminal of said squelching means and an output terminal of said discriminator, and in which a capacitor is connected between ground and said first input terminal.

* * * * *